(12) United States Patent
Otto et al.

(10) Patent No.: US 8,961,056 B2
(45) Date of Patent: Feb. 24, 2015

(54) RECLINER MECHANISM

(75) Inventors: Jürgen Otto, Burscheid (DE); Ingo Kienke, Wermelskirchen (DE); Martin Zynda, Burscheid (DE); Joachim Blenz, Büchenbeuren (DE); Kirubaharan Albert, Burscheid (DE); Mario Budweg, Hückeswagen (DE)

(73) Assignee: Johnson Controls GmbH, Burscheid (DE)

( * ) Notice: Subject to any disclaimer, the term of this patent is extended or adjusted under 35 U.S.C. 154(b) by 1804 days.

(21) Appl. No.: 11/664,928

(22) PCT Filed: Oct. 7, 2005

(86) PCT No.: PCT/EP2005/055112
§ 371 (c)(1),
(2), (4) Date: Nov. 20, 2008

(87) PCT Pub. No.: WO2006/040303
PCT Pub. Date: Apr. 20, 2006

(65) Prior Publication Data
US 2009/0072605 A1    Mar. 19, 2009

(30) Foreign Application Priority Data
Oct. 7, 2004 (DE) .......................... 10 2004 049 114

(51) Int. Cl.
*B60N 2/02* (2006.01)
*B60N 2/225* (2006.01)

(52) U.S. Cl.
CPC .................................... *B60N 2/2252* (2013.01)
USPC .............................. 403/97; 297/362; 475/162

(58) Field of Classification Search
USPC ............. 74/434, 438; 297/362, 367 P, 367 R, 297/361.1; 475/162, 169, 170, 176, 177, 475/180
See application file for complete search history.

(56) References Cited

U.S. PATENT DOCUMENTS 4,196,931 A * 4/1980 Werner .......................... 297/362
6,805,650 B2 * 10/2004 Branov et al. ................. 475/162

FOREIGN PATENT DOCUMENTS

| DE | 1291570 | 3/1969 |
| DE | 1555711 | 10/1969 |

(Continued)

OTHER PUBLICATIONS

Seat Adjustment (Translation of JP2003235667), McElroy Translation Company, Jul. 2012.*

(Continued)

*Primary Examiner* — Daniel P Stodola
*Assistant Examiner* — Daniel Wiley
(74) *Attorney, Agent, or Firm* — Foley & Lardner LLP

(57) ABSTRACT

An adjusting device for a vehicle component includes a first fitting part arranged on an axis of rotation and a second fitting part arranged on the axis of rotation. The relative position of the first fitting part and the second fitting part with respect to each other is adjustable. The adjusting device also includes an eccentric arranged on and rotatable about the axis of rotation and a plurality of first rotating members arranged concentrically about the eccentric. The first rotating members are configured to roll along the first fitting part. The adjusting device further includes a plurality of subcomponents that each include a first fitting-part element of the first fitting part and a second fitting-part element of the second fitting part. The plurality of subcomponents are arranged substantially symmetrically with respect to a plane of symmetry that extends at right angles to the axis of rotation.

13 Claims, 3 Drawing Sheets

(56) References Cited

FOREIGN PATENT DOCUMENTS

| | | |
|---|---|---|
| DE | 83 068 | 7/1970 |
| DE | 28 34 707 | 12/1979 |
| DE | 37 23 204 A1 | 1/1989 |
| DE | 197 02 123 A1 | 10/1997 |
| DE | 101 57 274 A1 | 6/2003 |
| FR | 2 743 764 | 7/1997 |
| GB | 1 170 708 | 11/1969 |
| GB | 1 237 796 | 6/1971 |
| GB | 2 207 044 | 1/1989 |
| JP | 54-182108 | 12/1979 |
| JP | 2001-017258 | 1/2001 |
| JP | 2003-235667 | 8/2003 |

OTHER PUBLICATIONS

"Reclining Apparatus" (Translation of DE2834707), Schreiber Translations, Inc. Aug. 2011.*

International Search Report for PCT/EP2005/055112, date of mailing Dec. 15, 2006, 3 pages.

German Examination Report dated Apr. 20, 2005 as received in German Patent Application No. 10 2004 049 114.3-12, 12 pages.

Japanese Examination Report dated Jun. 21, 2011 as received in corresponding Japanese Application No. 2007-535181, 3 pages.

German Examination Report received in connection with German application No. DE 10 2004 049 114.3; dtd Jan. 10, 2013.

* cited by examiner

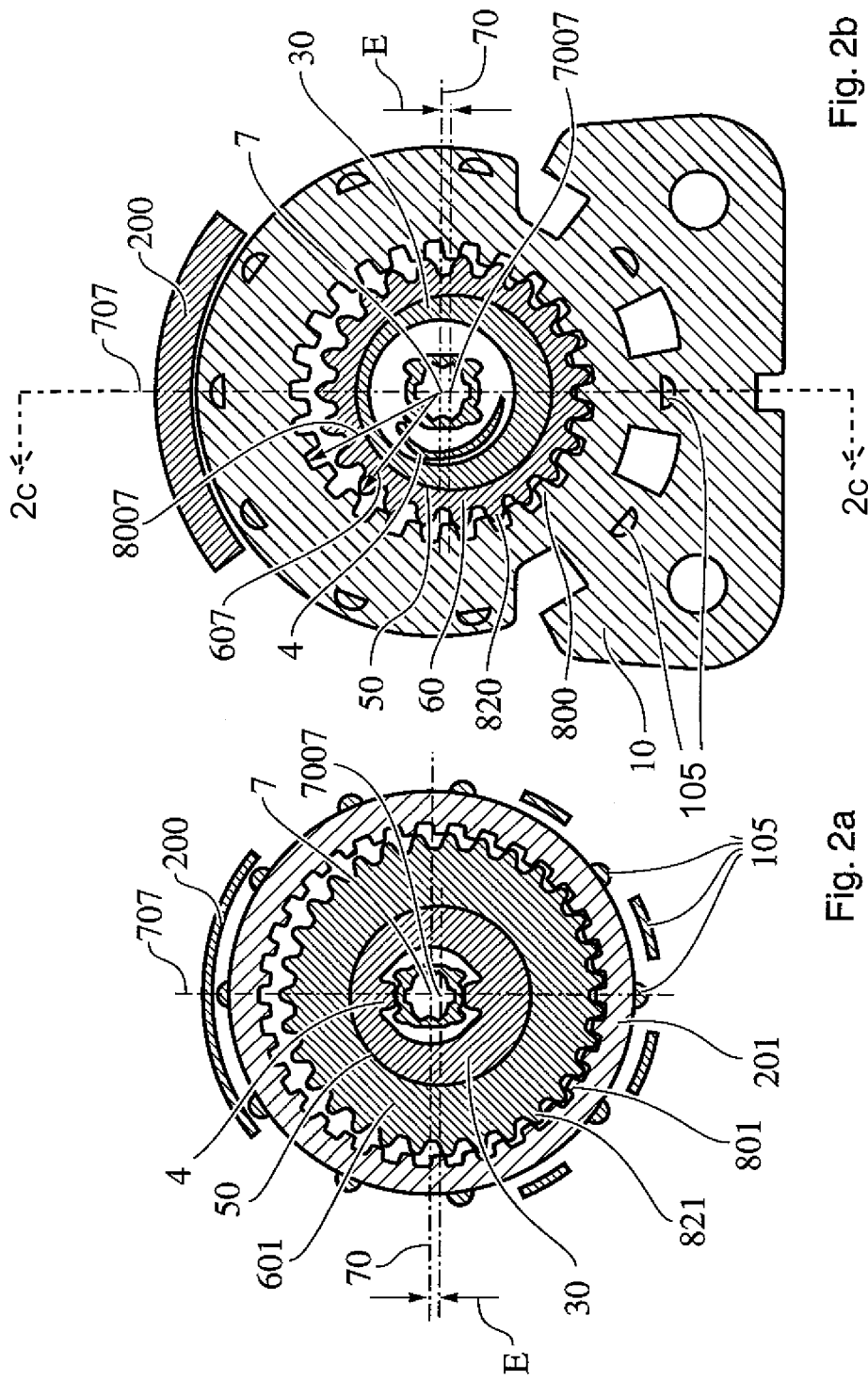

RECLINER MECHANISM

CROSS-REFERENCE TO RELATED PATENT APPLICATIONS

The present application is a National Stage of International Application No. PCT/EP2005/055112 filed on Oct. 7, 2005, which claims the benefit of German Patent Application No. DE 10 2004 049 114.3 filed on Oct. 7, 2004. The entire disclosures of International Application No. PCT/EP2005/055112 and German Patent Application No. DE 10 2004 049 114.3 are incorporated herein by reference.

BACKGROUND

The present disclosure relates to a recliner mechanism or an adjusting device for a vehicle component (e.g., a vehicle seat). The present disclosure also relates to a method of producing a recliner mechanism or an adjusting device.

To adjust the inclination of components, such as the backrest of a vehicle seat relative to the seat part, use is often made of wobbling adjusters since they are in continuous engagement, ensure a high transmission ratio, are self-locking and can rotate relatively easily. The components of the inclination adjusters are typically produced by fine blanking or similar processes that are relatively complicated and expensive in terms of production since they have to meet certain requirements with regard to strength and are intended to limit system-induced play within the inclination adjusters to avoid rattling noises. Furthermore, measures are often used to further reduce and/or compensate for system-induced play. This generally requires a plurality of complicated additional components. Due to the complicated shapes, use is often made in the processing state of initially softer materials that subsequently have to be hardened. Therefore, the manufacturing of the inclination adjusters is expensive.

Accordingly, there is a need to provide an adjusting device for a vehicle component, such as for a motor vehicle seat, in which the system-induced play is reduced and/or compensated for with less complicated means, and/or which requires less exacting manufacturing tolerances, and/or which requires a lesser degree of strength and/or which can be produced more rapidly, simply and cost-effectively.

SUMMARY

One exemplary embodiment relates to an adjusting device for a vehicle component. The adjusting device includes a first fitting part arranged on an axis of rotation and a second fitting part arranged on the axis of rotation. The relative position of the first fitting part and the second fitting part with respect to each other is adjustable. The adjusting device also includes an eccentric arranged on and rotatable about the axis of rotation and a plurality of first rotating members arranged concentrically about the eccentric. The first rotating member are configured to roll along the first fitting part. The adjusting device further includes a plurality of subcomponents that each include a first fitting-part element of the first fitting part and a second fitting-part element of the second fitting part. The plurality of subcomponents are arranged substantially symmetrically with respect to a plane of symmetry that extends at right angles to the axis of rotation.

Another exemplary embodiment relates to a recliner mechanism for a vehicle seat. The recliner mechanism includes a first subcomponent supported by a shaft and having a first fitting-part, a second fitting-part, a first eccentric element and first and second rotating member. The and first and second rotating members are arranged concentrically with the first eccentric element. The recliner mechanism also includes a second subcomponent supported by the shaft and having a first fitting-part, a second fitting-part, a second eccentric element and first and second rotating members. The and first and second rotating members are arranged concentrically with the second eccentric element. The first and second subcomponents are arranged substantially mirror-symmetrically with respect to a plane of symmetry that extends at right angles to the shaft.

Another exemplary embodiment relates to a method for producing an adjusting device having a first fitting part adjustable relative to a second fitting part about an axis of rotation, a first rotating member configured to roll along of the first fitting part and the second fitting part for adjusting the first fitting part relative to the second fitting part, and a plurality of subcomponents having first fitting-part elements of the first fitting part and second fitting-part elements of the second fitting part. The plurality of subcomponents are arranged substantially mirror-symmetrically with respect to a plane of symmetry that extends at a right angle to the axis of rotation. The method includes the steps of forming the first rotating, the first fitting-part elements and the second fitting-part elements out of a substantially planar material, and at least partially connecting the first rotating member, the first fitting-part elements and the second fitting-part elements to one another.

BRIEF DESCRIPTION OF THE DRAWINGS

FIG. 2a is a partial, cross-sectional view of the adjusting device of FIG. 1 taken transversely to the axis of rotation.

FIG. 2b is an alternate, partial cross-sectional view of the adjusting device of FIG. 1 taken transversely to the axis of rotation 7.

DETAILED DESCRIPTION

Figure 1:
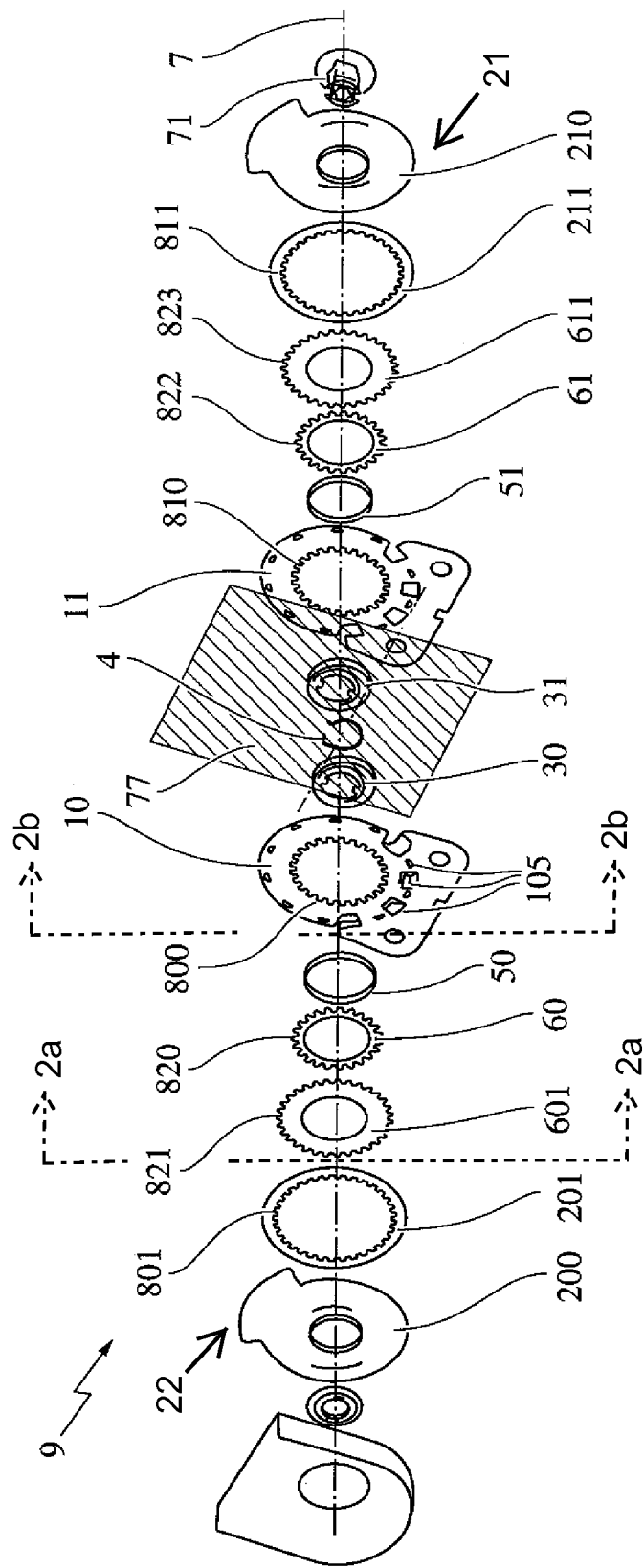
FIG. 1 is an exploded, perspective view of an adjusting device according to an exemplary embodiment.

According to an exemplary embodiment, an adjusting device for a vehicle component (e.g., a vehicle seat) includes a first fitting part, a second fitting part and an eccentric that are each arranged on a common axis of rotation. In an operating mode, the axis of rotation rotates, thereby causing the eccentric to rotate about the axis of rotation, which in turn adjusts the relative position of the two fitting parts with respect to each other. According to an exemplary embodiment, the eccentric includes a first eccentric element and a second eccentric element. Each eccentric element includes at least one first rotating member or means arranged concentrically about the eccentric. The second fitting part is formed from two second fitting-part elements and the first fitting part is formed from two first fitting-part elements. In the operating mode, the first rotating means rolls along the first fitting part.

The adjusting device has a plurality of subcomponents that each include a first fitting-part element, a second fitting-part element and optionally an eccentric element that are each arranged on a common axis of rotation, with the subcomponents being arranged substantially mirror-symmetrically with respect to a plane of symmetry which extends substantially at right angles to the axis of rotation in the center of the adjusting device. The division of the second fitting part into two second fitting-part elements and of the first fitting part into two first fitting-part elements, and optionally of the eccentric into a first and a second eccentric element results in the fitting-part elements and/or the eccentric elements having a less complicated contour in comparison to the contour of the fitting parts and of the eccentric. This enables less soft materials to be processed, and therefore the materials no longer have to be hardened after processing. The eccentric elements and the fitting-part elements can therefore be manufactured more cost-effectively and rapidly.

In view of the substantially mirror-symmetrical arrangement, the shape of the second fitting-part elements, the first fitting-part elements and the rotating means are substantially identical. The division of the fitting parts and the high number of rotating means therefore do not lead to an increased diversity of components but rather merely to high piece numbers, and therefore the additional costs because of the high number of components are compensated for by the more cost-effective manufacturing and because it is not necessary to harden the material. The mirror-symmetrical arrangement can be fitted simply, optionally automatically and therefore cost-effectively.

The substantially symmetrical arrangement of the adjusting device enables the force flux to be divided substantially symmetrically with respect to the plane of symmetry, and therefore there is lower individual loading of the subcomponents. Less hard materials or less thick materials can therefore be used, and therefore the adjusting device is lighter, requires less space and hardening of the material does not have to take place. In addition, a more cost-effective material can optionally be used. The sub-components can therefore be produced more cost-effectively.

A person skilled in the art will understand that the first fitting-part elements can also be designed as a single part. Similarly, when there is a single-part eccentric, the first rotating means can be designed as a single part. According to an exemplary embodiment, the first rotating means can be arranged on the second fitting parts in a rotationally fixed manner and can roll along the first fitting parts. According to an exemplary embodiment, the first rotating means also roll along the second fitting parts. According to an exemplary embodiment, each subcomponent has a second rotating means, with one first rotating means per subcomponent being arranged on the eccentric or optionally on the eccentric element. In such an embodiment, one second rotating means is arranged per subcomponent, the rotating means being arranged at right angles to the axis of rotation and concentrically about the eccentric or the eccentric elements. In the operating mode, the first fitting-part elements can be adjusted relative to the second fitting-part elements by rotation of the eccentric or of the eccentric elements about the axis of rotation, with the first rotating means of the subcomponents each rolling along the first fitting-part element. According to an exemplary embodiment, the second rotating means of the subcomponents rolls along the second fitting-part element of the same subcomponent.

According to an exemplary embodiment, the eccentric elements are offset with respect to each other by an angle about the axis of rotation, the angle substantially being a fraction of 360°, and the divisor corresponding to the number of subcomponents or of the fitting parts to be adjusted.

The division of the fitting parts, and optionally of the eccentric, into fitting-part elements and eccentric elements permits substantially any desired number of subcomponents arranged on the axis of rotation and therefore connected one behind another, with the relative position of the fitting-part elements of the sub-components being at least partially adjustable with respect to each other. Since the number of components increases with an increasing number of subcomponents, the outlay on manufacturing also increases, and therefore the number of subcomponents or the number of fitting parts which can be adjusted relative to one another is limited due to the outlay. A person skilled in the art will understand that the arrangement of the eccentric elements at an angle with respect to each other that is a fraction of 360° is advantageous, in that the forces occurring in the subcomponents advantageously at least partially cancel one another out. Embodiments are also possible, in which the angle is not a fraction of 360° and/or in which the divisor does not correspond to the number of fitting parts to be adjusted.

According to an exemplary embodiment, the adjusting device has one first subcomponent and one second subcomponent, the first fitting part of which or the first fitting-part elements of which are adjustable relative to the second fitting-part elements. In this embodiment, the fraction is the number 2 and the angle about which the eccentric elements can advantageously be offset with respect to each other about the axis of rotation is 180°. The eccentric elements may also not be offset with respect to each other or the eccentric may be designed as a single part.

For example, according to an exemplary embodiment, one adjusting device is arranged per side of a vehicle seat, with, for example, the first fitting part being connected fixedly to a seat surface structure and the second fitting part being connected fixedly to a backrest structure. It is conceivable for different embodiments of the adjusting device to be arranged on the two sides of the vehicle seat. By increasing the number of subcomponents, it is possible, for example, to advantageously increase the force which can be transmitted by the adjusting device. For example, a greater number (e.g., twice the number) of subcomponents can be provided on a side of a vehicle seat on which a seatbelt is fastened. The greater demand imposed on the adjusting device by the additional load which is transmitted, for example, in an accident situation via the seatbelt can advantageously be taken into account by this modular construction of the adjusting device.

According to an exemplary embodiment, a center axis running through the first center point of the first eccentric element and the second center point of the second eccentric element intersects the axis of rotation. The first and the second eccentric elements are therefore adjusted about the axis of rotation substantially by 180° with respect to each other such that they are arranged substantially point-symmetrically with respect to the intersecting point of the center axis with the axis of rotation. A person skilled in the art will understand that, in this embodiment, the number of fitting parts to be adjusted is an even number and, in particular, also comprises the adjustment of precisely two fitting parts relative to each other. Since the eccentric elements are arranged substantially symmetrically to each other, the shape of the eccentric elements is substantially identical, and therefore the number of different components is not increased by the division of the eccentric into eccentric elements, and, by contrast, there are high piece numbers of the eccentric elements.

According to an exemplary embodiment, the eccentric elements are clamped in relation to each other by a dynamic means (e.g., by means of a spring). The dynamic means at least partially absorbs and/or compensates for the forces acting between the subcomponents and/or eccentric elements during rotation of the axis of rotation, and therefore there is substantially no inadvertent change of the angle about which the eccentric elements are offset with respect to each other. Since the eccentric elements are arranged directly next to each other on the axis of rotation, they can be clamped in relation to each other in a particularly simple and effective manner. In the case of a plurality of rotating means per subcomponent, the clamping is particularly advantageous in order to keep all of the rotating means in engagement with the respective fitting parts. This very effectively avoids, for example, the adjusting device emitting annoying rattling noises.

According to an exemplary embodiment, the eccentric comprises a first eccentric element and a second eccentric element that are arranged next to each other on the axis of rotation and bear against each other. Together with the dynamic means, they form a rotating body, with a first rotating means which rolls in each case along the first fitting part, and a second rotating means which rolls in each case along the second fitting part. The rotating means are arranged at right angles to the axis of rotation and concentrically about the eccentric elements, being arranged on each eccentric element, and with, in an operating mode, by rotation of the rotating body about the axis of rotation, the first fitting part can be adjusted relative to the second fitting part, with the rotating body revolving the axis of rotation substantially concentrically. The person skilled in the art will understand that, in the case of an adjusting device with more than two subcomponents, the rotating body is formed by the total number of eccentric elements.

According to an exemplary embodiment, the rotating body revolves the axis of rotation substantially concentrically. The center point of the rotating body is therefore situated substantially on the axis of rotation in the operating mode. Since the eccentric elements are connected to the axis of rotation and the eccentricity of the eccentric elements with regard to the axis of rotation is substantially always identical, their relative position with respect to each other and to the axis of rotation is substantially determined by the dynamic means by means of which the eccentric elements are clamped in relation to each other.

According to an exemplary embodiment, the adjusting device has a shaft which forms the axis of rotation. The play between the eccentric elements and the shaft makes it possible for the dynamic means to rotate the eccentric elements in relation to each other. No further complicated components for reducing the play are required.

In the case of an adjusting device with an even number of fittings to be adjusted with respect to one another and, in particular, with precisely two subcomponents, the rotating body has a maximum dimension, which substantially corresponds to a maximum inside diameter of a fitting part or of a fitting-part element, along its center axis.

According to an exemplary embodiment, the second fitting-part elements each have a plurality of second fitting-part intermediate elements (e.g., at least two) arranged substantially parallel to one another. As a result, the contour of the second fitting-part intermediate elements is also further simplified in comparison to the first fitting-part elements and the production of the second fitting-part intermediate elements can therefore be carried out more easily and, in particular, without a final hardening process. In each case one fitting-part intermediate element of the first subcomponent bears against one of the two first fitting-part elements, and in each case one fitting-part intermediate element of the second subcomponent bears against the other of the two first fitting-part elements. Likewise, each sub-component has an outer fitting-part intermediate element in each case. The outer fitting-part intermediate element is the fitting-part intermediate element of a subcomponent, the distance of which from the plane of symmetry is at maximum.

The first fitting part and/or the first fitting-part elements and/or the second fitting-part elements and/or the second fitting-part intermediate elements and/or the first and second rotating means preferably extend in an substantially planar manner and/or can be produced from a material extending in a planar manner. As a result, they can be produced using conventional methods and in short cycle times and from cost-effective material, for example from thin sheets. Due to the simple contours and the resultant simpler manufacturing, the fitting parts, fitting-part elements, fitting-part intermediate elements and/or rotating means can be produced by harder materials, and therefore, in particular, do not have to be hardened after being processed. The components can therefore be produced simply, rapidly, cost-effectively and optionally in an automated manner.

According to an exemplary embodiment, the first fitting part and/or the first fitting-part elements bear at least partially against the second fitting-part elements and/or the second fitting-part intermediate elements, with the second fitting-part elements and/or the second fitting-part intermediate elements bearing at least partially against one another and with the first and second rotating means each bearing at least partially against one another.

The fitting parts, fitting-part elements, fitting-part intermediate elements and rotating means, which bear against one another, can be fitted easily and can be connected to one another in a simple manner. For example, they can be welded to one another, such as by means of laser welding, such that their strength and/or the strength of the adjusting device is improved, and they cannot be adjusted and/or tilted in relation to one another.

The substantially planar and parallel arrangement of the fitting parts, fitting-part elements, fitting-part intermediate elements and rotating means with respect to one another means that their surface load-bearing capacity is very high, since forces which act on components which bear in parallel and in a planar manner against one another are distributed substantially uniformly to the components.

The first fitting part and/or the first fitting-part elements in each case have a first inter-locking and/or frictional means which is arranged concentrically about the axis of rotation, with the second fitting-part elements and/or at least one second fitting-part intermediate element in each case having a second interlocking and/or frictional means which is arranged concentrically about the axis of rotation, with the first rotating means each having a third interlocking and/or frictional means and the second rotating means each having a fourth interlocking and/or frictional means, with the third interlocking and/or frictional means each being at least partially in engagement with a first interlocking and/or frictional means, and the fourth interlocking and/or frictional means each being at least partially in engagement with a second interlocking and/or frictional means. As a result, when the axis of rotation is rotated, the rotating means are rotated in such a manner that the third interlocking and/or frictional means roll along the first interlocking and/or frictional means, and the fourth interlocking and/or frictional means roll along the second interlocking and/or frictional means.

According to an exemplary embodiment, the rotating body includes a first and a second sliding means, with the first sliding means being arranged concentrically about the eccentric or the first eccentric element and between the first eccentric element and the first and/or second rotating means of the first subcomponent, and with the second sliding means being arranged concentrically about the eccentric or the second eccentric element and between the first and/or second rotating means of the second subcomponent. The sliding means reduces the friction between the eccentric or the eccentric elements and the rotating means and ensures uniform concentricity during rotation of the eccentric or of the eccentric elements. A person skilled in the art will understand that the sliding means can be provided both as a separate component and as part of the rotating means. According to an exemplary embodiment, the surface of the rotating means that interacts with the eccentric elements has a sufficiently low degree of friction during rotation of the eccentric elements such that a sliding means does not have to be provided.

According to an exemplary embodiment, the interlocking and/or frictional means are teeth. Teeth have the advantage that they are even in engagement with one another when they are adjusted slightly with respect to one another, and they can therefore roll along one another even then. Furthermore, teeth have the advantage of being able to be adjusted uniformly in relation to one another. In addition, toothings can be produced using conventional means.

The number of teeth of the third interlocking and/or frictional means differs from the number of teeth of the fourth interlocking and/or frictional means. A person skilled in the art will understand that, in the operating mode, the different number of teeth lead to a displacement of the first interlocking and/or frictional means relative to the second interlocking and/or frictional means such that, in the operating mode, the first fitting part is adjusted relative to the second fitting part. The different number of teeth therefore determines the transmission ratio with which the fitting parts are adjusted with respect to each other. In the case of two subcomponents, the different number of teeth determines the transmission ratio of the adjusting device.

According to an exemplary embodiment, the first rotating means of the first and second subcomponents have a first external radius, with the second rotating means of the first and second subcomponents having a second external radius, and with the first external radius differing from the second external radius. As a result, the rotating means with the larger external radius slides at least partially along a surface, which is substantially parallel to the plane of symmetry, of the fitting-part elements along which the rotating means with the smaller external radius roll. The rotating means are nestled in the direction of the axis of rotation such that, for example, the play along the axis of rotation is reduced. There is substantially no wobbling about the axis of rotation.

By means of the division of the adjusting device into symmetrically constructed subcomponents, the forces acting on the adjusting device are distributed substantially symmetrically to its subcomponents, and therefore the individual loading is lower. Since they bear at least partially against one another, their surface load-bearing capacity is large. Overall, materials which are less strong can therefore be used. In the case of use of materials extending in an substantially planar manner, for example sheets which are arranged parallel to one another, the fitting parts, fitting-part elements, fitting-part intermediate elements and/or rotating means have fewer complicated contours, and they can therefore be produced from harder material and more simply. A hardening process after production of these components is therefore dispensed with. Owing to the nestled arrangement, there is little play between them, and therefore additional components for reducing the play are not required, and the demands imposed on the manufacturing tolerances are less exacting.

According to an exemplary embodiment, the first fitting part or the first fitting-part elements have retaining means. The retaining means ensure the relative position of the second fitting-part elements or of the second fitting-part intermediate elements, such that substantially no inadvertent offset can be produced between the first fitting part or the first fitting-part elements and the second fitting part or the second fitting-part elements. Furthermore, they increase the rigidity of the adjusting device.

According to an exemplary embodiment, a method for producing an adjusting device includes punching the rotating means and fitting parts out of a planar material and subsequently partially connecting them to one another, preferably by laser welding. The first and second rotating means of the subcomponents are each connected to one another in a rotationally fixed manner, with the fitting-part intermediate elements of the subcomponents being connected to one another in a rotationally fixed manner, with the fitting-part elements of the subcomponents optionally being at least partially connected to one another or being integral, with the components of the adjusting device being arranged on the axis of rotation, and with the fitting-part elements and/or at least one fitting-part intermediate element of the two subcomponents arranged on the outside then being at least partially connected to one another.

The method can be carried out rapidly, simply and at least partially in an automated manner and is therefore cost-effective.

Referring now to the FIGURES, the exemplary embodiments are described below. The FIGURES are merely by way of example and do not restrict the scope of the appended claims.

Figure 3:
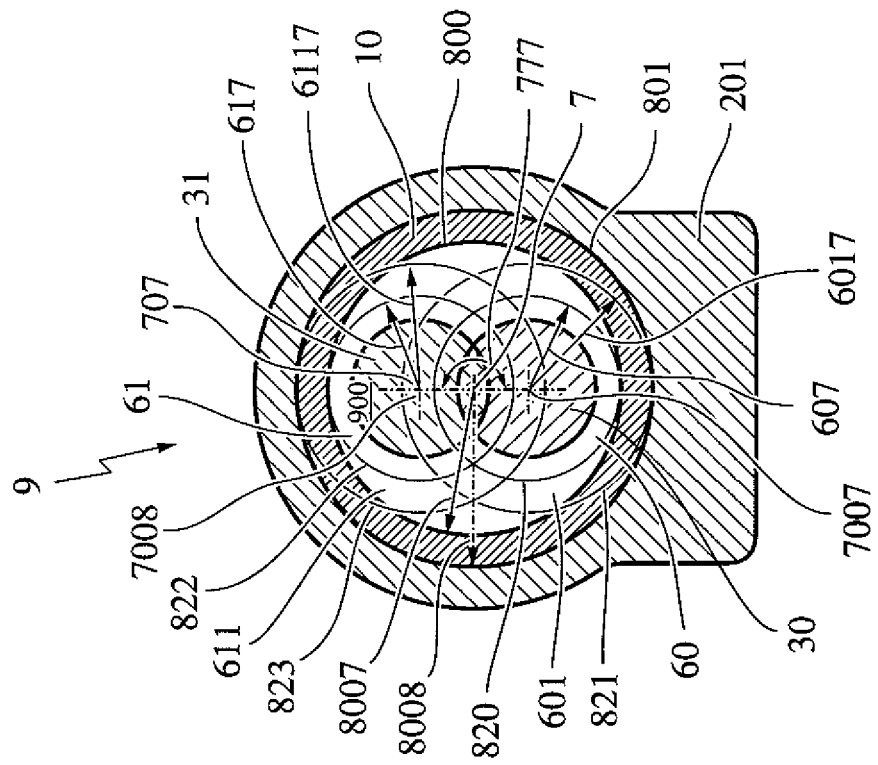
FIG. 3 is a schematic, cross-sectional illustration of the arrangement of an interlocking member in a cross section taken parallel to the plane of symmetry of the adjusting device of FIG. 1.

Referring generally to FIGS. 1-3, FIG. 1 shows an exploded illustration of an adjusting device 9 according to an exemplary embodiment. The adjusting device 9 includes a first subcomponent and a second subcomponent. The first subcomponent includes a first fitting-part element 10, a second fitting-part element 20 and an eccentric arrangement or element 30 (e.g., an eccentric). The second subcomponent includes a first fitting-part element 11, a second fitting-part element 21 and an eccentric arrangement or element 31. The first fitting-part element 10, 11, the second fitting-part 20, 21 and the eccentric element 30, 31 are arranged substantially parallel to one another and on a common axis of rotation 7. The first subcomponent and second subcomponent, the first fitting-part elements 10, 11, the second fitting-part elements 20, 21 and the eccentric elements 30, 31 are each arranged with respect to one another substantially mirror-symmetrically with regard to a plane of symmetry 77 arranged transverse (at right angles) to the axis of rotation 7. The adjusting device 9 also includes a shaft 71 that defines the axis of rotation 7. The eccentric element 30 of the first subcomponent is the first eccentric element 30 and the eccentric element 31 of the second subcomponent is the second eccentric element 31. The first eccentric element 30 is rotated with respect to the second eccentric element 31 substantially by an angle 777 (shown in FIG. 3) about the axis of rotation 7. According to an exemplary embodiment, the angle 777 is substantially equal to 360° divided by the corresponding number of subcomponents. According to the embodiment illustrated, the number of subcomponents is two and, as such, the angle 777 is 180°. The first fitting-part elements 10, 11 form a first fitting part, the second fitting-part elements 20, 21 form a second fitting part and the eccentric elements 30, 31 form an eccentric, with the eccentric elements 30, 31 being clamped in relation to each other by a biasing element or dynamic means 4 (shown as a spring). The second fitting-part elements 20, 21 each have two second fitting-part intermediate elements 200, 210, 201, 211, with at least one of the fitting-part intermediate elements 201, 211 in each case having a second interlocking and/or frictional portion or means 801, 811 (shown as an internal toothing). The first fitting-part elements 10, 11 also have a first interlocking and/or frictional portion or means 800, 810 (shown as an internal toothing).

Referring still further to FIG. 1, the adjusting device 9 also includes a respective first rotating member or means 60, 61 and a second rotating member or means 601, 611 of the first and second subcomponents. The respective first and second rotating members 60, 601 are arranged concentrically about the first eccentric element 30 in the constructed state of the adjusting device 9, and the respective first and second rotating members 61, 611 are arranged concentrically about the second eccentric element 31 and at right angles to the axis of rotation 7 in the constructed state of the adjusting device 9. The first rotating members 60, 61 each have a third interlocking and/or frictional member or means 820, 822 (shown as external toothings) and the second rotating members 601, 611 have a fourth interlocking and/or frictional member or means 821, 823 (shown as external toothings). The first rotating members 60, 61 have a smaller first external radius 607, 617 in comparison to the second external radii 6017, 6117 of the second rotating members 601, 611. The third and fourth interlocking and/or frictional members 820, 822, 821, 823 differ in the number of teeth. The external radius 607, 617, 6017, 6117 of a rotating member 60, 61, 601, 611 (having an external toothing) is the largest possible external radius and is determined by the profile or size of the teeth (e.g., shown in FIG. 2b using the example of the first external radius 607 of the first rotating member 60). Likewise, the external radius 607, 617, 6017, 6117 of a rotating member 60, 61, 601, 611 is dependent on the configuration of an interlocking and/or frictional member 820, 821, 822, 823 of the rotating member 60, 61, 601, 611.

When assembling the adjusting device, the first fitting-part elements 10, 11, the second fitting-part intermediate elements 20, 21, and the respective first and second rotating members 60, 601 of the first and second subcomponents are connected to one another (i.e., most preferably by means of laser welding) and the components of the adjusting device 9 are then arranged in the sequence illustrated. The second fitting-part intermediate elements 201, 211, which bear at least partially against the first fitting-part elements 10, 11, are guided and/or fixed on the first fitting-part elements 10, 11 by means of retaining member or means 105. After the components are arranged, the outer, second fitting-part intermediate elements 200, 210 are connected to each other (e.g., by means of laser welding). In the constructed state, the eccentric elements 30, 31 form a rotating body, with a first bearing or sliding means 50 being arranged between the first eccentric element 30 and the first and/or second rotating members 60, 601 of the first subcomponent, and a second bearing or sliding means 51 being arranged between the second eccentric element 31 and the first and/or second rotating members 61, 611 of the second subcomponent (see FIGS. 2a, 2b and 2c).

In the operating state, the rotating body is rotated concentrically about the axis of rotation 7, with the third interlocking and/or frictional member 820 of the first rotating member 60 rolling along the first interlocking and/or frictional member 800 of the first fitting-part element 10 of the first subcomponent, and the third interlocking and/or frictional member of the first rotating member 61 rolling along the first interlocking and/or frictional member 810 of the first fitting-part element 11 of the second subcomponent, and with the fourth interlocking and/or frictional member 821 of the second rotating member 601 rolling along the second interlocking and/or frictional member 801 of the second fitting-part intermediate element 201 of the first subcomponent, and the fourth interlocking and/or frictional member 823 of the second rotating member 611 rolling along the second interlocking and/or frictional member 811 of the second fitting-part intermediate element 211 of the second subcomponent. The second fitting-part intermediate element 201, 211, along the second interlocking and/or frictional members 801, 811 of which the fourth interlocking and/or frictional members 821, 823 of the second rotating members 601, 611 roll, bear at least partially against the first fitting-part elements 10, 11. Due to the different number of teeth, the first fitting part is rotated relative to the second fitting part.

Referring to FIG. 2a, which is a cross sections through the first subcomponent of the adjusting device 9, the first eccentric element 30, about which the first sliding member 50 is arranged concentrically, about which the second rotating member 601 is arranged again concentrically, is visible. The second rotating member 601 has the fourth interlocking and/or frictional member 821 which bears at least partially against the second fitting-part intermediate element 201 which, in the constructed state, bears at least partially against the first fitting-part element 10. The second fitting-part intermediate element 201 has the second interlocking and/or frictional member 801 which is at least partially in engagement with the fourth interlocking and/or frictional member 821 of the second rotating member 601. The retaining member 105 of the first fitting-part element 10 are also visible. In addition, the outer fitting-part intermediate element 200, which, in the constructed state, is welded to the second fitting-part intermediate element 201, which bears against the first fitting-part element 10, is at least partially visible. The dynamic means 4, which clamps the first and the second eccentric elements 30, 31 in relation to each other, is at least partially visible. The axis of rotation 7 is indicated by a cross. The first eccentric element 30, the first sliding member 50 and the second rotating member 601 are arranged concentrically about the first center point 7007 of the first eccentric element 30 and eccentrically about the axis of rotation 7. The distance of the first center point 7007 of the first eccentric element 30 from the axis of rotation 7 is the eccentricity E of the first eccentric element 30. FIG. 2a also shows the center axis 707, which connects the first center point 7007 of the first eccentric element 30 to the second center point 7008 of the second eccentric element 31.

Referring to FIG. 2b, the first fitting-part element 10 is shown with the first interlocking and/or frictional member 800, and the first rotating member 60 is shown with the third interlocking and/or frictional member 820, which is at least partially in engagement with the first interlocking and/or frictional member 800. The first rotating member 60 is arranged concentrically about the first eccentric element 30. It should be noted that the above details apply analogously to the second subcomponent.

Figure 2C:
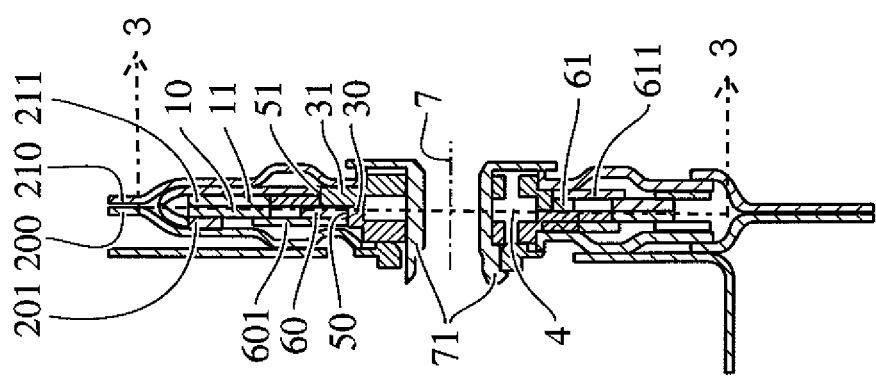
FIG. 2c is a partial cross-sectional view of the adjusting device of FIG. 1 taken along the axis of rotation 7 of the adjusting device of FIG. 1.

Referring to FIG. 2c, a cross section of the adjusting device 9 in the constructed state along the axis of rotation 7 is shown. The second fitting-part intermediate elements 201, 200, 210, 211 are shown, with a respective outer fitting-part intermediate element 201, 211 and a fitting-part intermediate element 200, 210, which bears at least partially against a first fitting-part element 10, 11 of the same subcomponent (e.g., the first subcomponent, the second subcomponent) and which is also welded to the outer fitting-part intermediate element 201, 211 of the same subcomponent thereby forming a second fitting-part element 20, 21. The two second fitting-part elements 20, 21 form the second fitting part. The second fitting-part elements 20, 21 bear at least partially against each other and are welded to each other. The two first fitting-part elements 10, 11, which form a first fitting part, bear at least partially against each other and are welded to each other. The first eccentric element 30 and the second eccentric element 31, which together form the eccentric 3 and are clamped in relation to each other by the dynamic member 4 (e.g., a spring), are arranged about the axis of rotation 7. Concentrically about the first eccentric element 30, the first and the second rotating member 60, 601 of the first subcomponent are arranged at right angles to the axis of rotation 7, with the first sliding member 50 being arranged between the first eccentric element 30 and its first and/or second rotating member 60, 601. Concentrically about the second eccentric element 31, the first and the second rotating members 61, 611 of the second subcomponent are arranged at right angles to the axis of rotation 7, with the second sliding member 51 being arranged between the second eccentric element 31 and its first and/or second rotating member 61, 611. According to an exemplary embodiment, the first and second rotating members 60, 601, 61, 611 of one of the subcomponents are each welded to one another. According to the embodiment illustrated, the first external radius 607 of the first rotating member 60 is identical to the first external radius 617 of the first rotating member 61. Likewise, the second external radius 6017 of the second rotating member 601 is identical to the second external radius 6117 of the second rotating member 611. According to such an embodiment, the first external radius 607 is different than the second external radius 6017, and the first external radius 617 is different than the second external radius 6117. Since the first and second eccentric elements 30, 31 are offset mirror-symmetrically to the plane of symmetry 77 (shown in FIG. 1) and by 180° with respect to each other about the axis of rotation 7, the rotating members 601, 611 (with the larger external radii 6017, 6117) slide at least partially along a surface, which is substantially parallel to the plane of symmetry 77, of the fitting-part elements 10, 11 along which the rotating members 60, 61 (with the smaller external radii 607, 617) roll. According to the embodiment illustrated, the second rotating members 601, 611 have the larger second external radii 6017, 6117. As a result, and since the eccentric elements 30, 31 each have an eccentricity E with respect to the axis of rotation 7 and are offset by 180° with respect to each other and with respect to the axis of rotation 7, a nested arrangement of the rotating members 601, 60, 61, 611 arises in which the first rotating members 60, 61, with the smaller first external radius 607, 617, are adjacent and are displaced with respect to each other in the direction of the center axis 707 by the amount of twice the eccentricity E. The second rotating members 601, 611 each bear against the first rotating members 60, 61 of the same subcomponent and the second rotating member 601 of the first subcomponent is displaced with respect to the second rotating member 611 of the second subcomponent in the direction of the center axis 707 by the amount of twice the eccentricity E.

Referring to FIG. 3, the arrangement of the interlocking and/or frictional members 800, 810, 801, 811, 820, 822, 821, 823 in a cross section parallel to the plane of symmetry 77 of the adjusting device 9 is shown schematically. FIG. 3 shows the second fitting-part intermediate element 201, which bears at least partially against the first fitting-part element 10, and, at least partially, the first fitting-part element 10 of the first subcomponent and the rotating body. The arrangement, however, applies analogously to the second fitting-part intermediate element 211 and the first fitting-part element 11 of the second subcomponent. The rotating body is formed from the first eccentric element 30 and the second eccentric element 31, with a respective first and second rotating members 60, 601, 61, 611 being arranged concentrically about the first and second eccentric elements 30, 31. The first, second, third and fourth interlocking and/or frictional members 800, 810, 801, 811, 820, 822, 821, 823 are each indicated by a circle. In the operating mode, the third interlocking and/or frictional members 820 of the first rotating member 60 of the first subcomponent rolls along the first interlocking and/or frictional member 800 of the first fitting-part element 10 of the first subcomponent. In the operating mode, the fourth interlocking and/or frictional member 821 of the second rotating member 601 of the second subcomponent rolls along the second interlocking and/or frictional member 801 of the at least one second fitting-part intermediate element 201 of the first subcomponent. In the operating mode, the third interlocking and/or frictional member 822 of the first rotating member 61 of the second subcomponent rolls along the first interlocking and/or frictional member 810 of the first fitting-part element 11 (the position of which is shown in parentheses for clarification purposes) of the second subcomponent. In the operating mode, the fourth interlocking and/or frictional member 823 of the second rotating member 611 of the second subcomponent rolls along the second interlocking and/or frictional member 811 of the at least one second fitting-part intermediate element 211 (the position of which is shown in parentheses for clarification purposes) of the second subcomponent.

The first external radii 607, 617 of the first rotating members 60, 61 are smaller than the second external radii 6017, 6117 of the second rotating members 601, 611. Accordingly, the first fitting-part elements 10, 11 have a first interlocking and/or frictional member 800, 810, the first internal radius 8007 of which differs from the second internal radius 8008 of the second interlocking and/or frictional member 801, 811 of the second fitting part elements 20, 21. The internal radii 8007, 8008 of an internally toothed interlocking and/or frictional member 800, 810, 801, 811 is the largest possible internal radius determined by the teeth (shown in FIG. 2b). The internal radii 8007, 8008 of an interlocking and/or frictional member 800, 810, 801, 811 of a fitting-part element 10, 11, 20, 21 is also the internal radius 8007, 8008 of the fitting-part element 10, 11, 20, 21. The internal radius 8007 of the interlocking and/or frictional members 800, 810, which are at least partially in engagement with the interlocking and/or frictional members 820, 822 of the first rotating member 60, 61 with the smaller, first external radii 607, 617, is smaller than the internal radius 8008 of the interlocking and/or frictional members 801, 811, which are in engagement with the interlocking and/or frictional members 821, 823 of the second rotating members 601, 611 with the larger, second external radii 6017, 6117.

FIG. 3 shows a plan view of the center axis 707, which connects the first center point 7007 of the first eccentric element 30 to the second center point 7008 of the second eccentric element 31 and substantially intersects the axis of rotation 7 and clarifies the angle 777 of 180° about which the eccentric elements 30, 31 are offset with respect to each other about the axis of rotation 7.

The invention claimed is:

1. An adjusting device for a vehicle component for a vehicle seat, the adjusting device comprising:
   a first subcomponent and a second subcomponent, wherein the first subcomponent is arranged substantially symmetrically to the second subcomponent with respect to a plane of symmetry that extends at right angles to an axis of rotation, and wherein each of the first and second subcomponents comprise:
      a first fitting part element centered on the axis of rotation;

a second fitting part element centered on the axis of rotation, wherein the second fitting part element includes a plurality of second fitting part intermediate elements arranged substantially parallel to one another;

an eccentric element arranged on and rotatable about the axis of rotation, wherein the eccentric element includes a first eccentric element in the first subcomponent and a second eccentric element in the second subcomponent, and wherein center points of the first and second eccentric elements are radially offset from the axis of rotation, and angularly offset with respect to each other about the axis of rotation by an angle of approximately 180 degrees;

a first rotating member arranged concentrically about the respective eccentric element, wherein a toothed outer periphery of the first rotating member is configured to roll along a toothed inner periphery of the first fitting part element; and a second rotating member different from and connected to the first rotating member and arranged concentrically about the respective eccentric element, wherein a toothed outer periphery of the second rotating member is configured to roll along a toothed inner periphery of the second fitting part element;

such that rotation of the eccentric member about the axis of rotation causes the first and second rotating members to engage the first and second fitting part elements, respectively, so as to adjust the relative positions of the first and second fitting part elements about the axis of rotation;

wherein the first fitting part elements, the second fitting part elements, and the first and second rotating members are substantially parallel to the plane of symmetry and extend in a substantially planar manner, wherein the first fitting part elements fixedly connect to a first structure of the vehicle seat and the second fitting part elements fixedly connect to a second structure of the vehicle seat, the second structure of the vehicle seat being movable relative to the first structure of the vehicle seat.

2. The adjusting device of claim 1 wherein the first fitting-part elements are integrally formed together, and wherein the first rotating members are separately formed relative to one another.

3. The adjusting device of claim 1 wherein the first eccentric element and the second eccentric element are arranged so that they bear against each other on the axis of rotation.

4. The adjusting device of claim 1 further comprising a shaft defining the axis of rotation.

5. The adjusting device of claim 1 wherein the second fitting-part intermediate elements or the second rotating members extend in substantially planar manner.

6. The adjusting device of claim 1 wherein the number of teeth of the first rotating members differs from the number of teeth of the second rotating members.

7. The adjusting device of claim 1 wherein the first fitting-part elements have retaining members configured to limit the offset between the second fitting-part intermediate elements and the first fitting-part elements.

8. The adjusting device of claim 1 wherein the position of the first eccentric element relative to the second eccentric element is regulated by a biasing member.

9. The recliner mechanism of claim 8 wherein the biasing member is a spring.

10. The adjusting device of claim 1,
wherein the first fitting-part elements fixedly connect to a seat surface structure of the vehicle seat, and the second fitting-part elements fixedly connect to a backrest structure of the vehicle seat;
wherein the backrest structure is movable relative to the seat surface structure via the adjusting device; and
wherein the eccentric of the first subcomponent and the eccentric of the second subcomponent are clamped in relation to each other by a biasing member.

11. An adjusting device for a vehicle component for a vehicle seat, the adjusting device comprising:
a first subcomponent and a second subcomponent, wherein the first subcomponent is arranged substantially symmetrically to the second subcomponent with respect to a plane of symmetry that extends at right angles to an axis of rotation, and wherein each of the first and second subcomponents comprise:

a first fitting part element centered on the axis of rotation;

a second fitting part element centered on the axis of rotation, wherein the second fitting part element includes a plurality of second fitting part intermediate elements arranged substantially parallel to one another;

an eccentric element arranged on and rotatable about the axis of rotation, wherein the eccentric element includes a first eccentric element in the first subcomponent and a second eccentric element in the second subcomponent, and wherein center points of the first and second eccentric elements are offset both radially from the axis of rotation, and angularly with respect to each other about the axis of rotation by an angle equal to 360 degrees divided by the number of subcomponents;

a first rotating member arranged concentrically about the respective eccentric element, wherein a toothed outer periphery of the first rotating member is configured to roll along a toothed inner periphery of the first fitting part element; and a second rotating member different from and connected to the first rotating member and arranged concentrically about the respective eccentric element, wherein a toothed outer periphery of the second rotating member is configured to roll along a toothed inner periphery of the second fitting part element;

such that rotation of the eccentric member about the axis of rotation causes the first and second rotating members to engage the first and second fitting part elements, respectively, so as to adjust the relative positions of the first and second fitting part elements about the axis of rotation;

wherein the first fitting part elements, the second fitting part elements, and the first and second rotating members are substantially parallel to the plane of symmetry and extend in a substantially planar manner, wherein the first fitting part elements fixedly connect to a first structure of the vehicle seat and the second fitting part elements fixedly connect to a second structure of the vehicle seat, the second structure of the vehicle seat being movable relative to the first structure of the vehicle seat;

wherein the first eccentric element and the second eccentric element are clamped in relation to each other by a biasing member.

12. The adjusting device of claim 11 wherein the first eccentric element and the second eccentric element together with the biasing member form a rotating body, and wherein in an operating mode, the first fitting part element is configured to be adjusted relative to the second fitting part element by the rotating body revolving substantially concentrically about the axis of rotation.

13. The adjusting device of claim 11 wherein the number of teeth of the first rotating members differs from the number of teeth of the second rotating members.

\* \* \* \* \*